United States Patent [19]
Roehle et al.

[11] Patent Number: 5,751,410
[45] Date of Patent: May 12, 1998

[54] METHOD FOR MEASURING FLOW VECTORS IN GAS FLOWS

[75] Inventors: Ingo Roehle, Bonn; Richard Schodl, Troisdorf, both of Germany

[73] Assignee: Deutsche Forschungsanstalt fur Luftund Raumfahrt e.V., Bonn, Germany

[21] Appl. No.: 564,790

[22] Filed: Nov. 29, 1995

[30] Foreign Application Priority Data

Dec. 3, 1994 [DE] Germany .................. 44 43 069.8

[51] Int. Cl.$^6$ ........................................ G01P 3/36
[52] U.S. Cl. ............................. 356/28; 356/28.5
[58] Field of Search ....................... 356/28, 28.5

[56] References Cited

U.S. PATENT DOCUMENTS

| | | | |
|---|---|---|---|
| 3,941,477 | 3/1976 | Schodl | 356/28 |
| 4,840,486 | 6/1989 | Schodl | 356/28 |
| 4,851,697 | 7/1989 | Schodl | 356/28 |
| 4,919,536 | 4/1990 | Komine | |

FOREIGN PATENT DOCUMENTS

| | | |
|---|---|---|
| 3421341 | 12/1985 | Germany . |
| 3518800 | 11/1986 | Germany . |
| 3712153 | 4/1987 | Germany . |

*Primary Examiner*—Stephen C. Buczinski
*Attorney, Agent, or Firm*—Akin, Gump, Strauss Hauer & Feld, LLP

[57] ABSTRACT

In the optical measurement of the flow vectors in gas flows, two substantially parallel light beams (11a, 11b) are focussed at separate focussing spots. The particles passing the focussing spots light up and thereby generate a start pulse and a stop pulse, respectively. Therewith, the component of the flow vector extending in the normal plane to the optical axis (OA) is detected by transit time measurement. The flow component pointing in the direction of the optical axis (OA) is detected independent thereof according to the Doppler principle by supplying the scattered light generated by the particles to an optical frequency/amplitude converter (22).

9 Claims, 4 Drawing Sheets

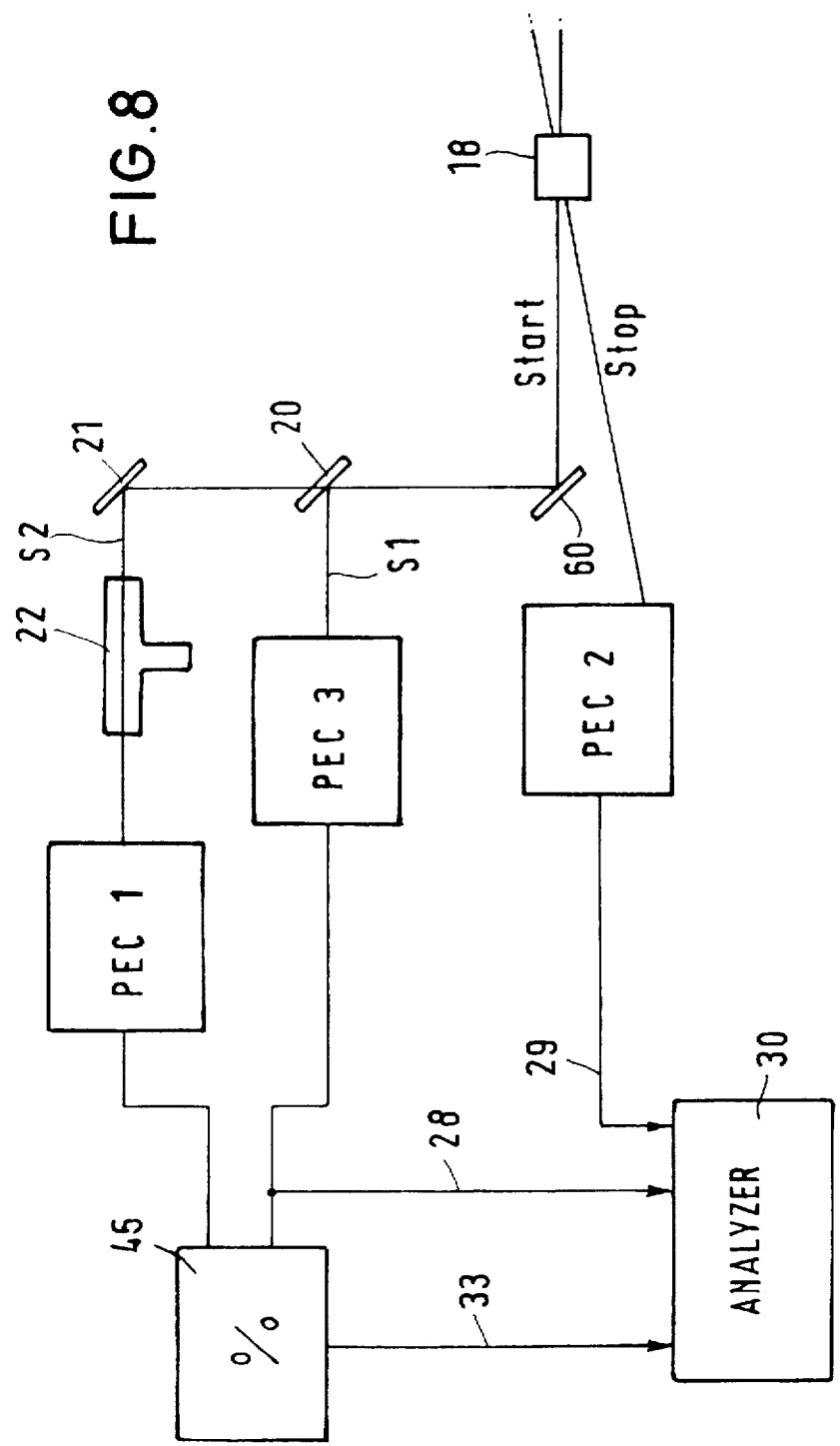

1

METHOD FOR MEASURING FLOW VECTORS IN GAS FLOWS

BACKGROUND OF THE INVENTION

The invention relates to a method and a device for measuring the flow vectors in gas flows.

From German Patent 37 12 153 C1, a method is known from which the precharacterizing part of claim 1 starts. In this method, the light of two laser beams is focussed by a focussing device in the flow channel at two focussing points arranged in close succession. When passing the focussing points, particles contained in the gas flow are illuminated. The scattered radiation reflected by the particles generates a start pulse when passing the first focussing point and a stop pulse when passing the second focussing point. By the time interval between these two pulses, that component of the vector of the particle velocity can be determined which extends in the plane of the two beams and passes through both focussing points. For determining that component of the flow vector which extends in beam direction, two measurements must be effected, wherein the measuring volume is respectively rotated by 180°, with the point of focus axially offset. By calculating the difference between the two measuring rates, the flow angle is detected with respect to the normal plane to the optical axis. This method requires a long measuring time due to the focal length variation.

The U.S. Pat. No. 4,919,536 describes a system for measuring the velocity field of a gas flow containing particles by using a laser Doppler spectral image converter. Particles transversely flow through a light plane generated by a laser. Two video cameras receive the scattered light generated by the particles. One camera receives the scattered light directly, and the other receives the scattered light via an optical frequency/amplitude converter. The velocity distribution over the light plane is detected from the video signals of the two cameras. Only a single velocity component is detected, namely the component in the direction of the angle bisector between the laser beam plane and the camera direction.

SUMMARY OF THE INVENTION

It is the object of the present invention to provide a method and device for measuring the flow vectors in gas flows to be able to completely determine the flow vectors by amount and spatial direction by means of a simple measuring equipment requiring not much space and being employable at sites difficult to access.

The method of the invention determines the flow vectors along that axis which passes through the two focussing spots according to the start-stop principle, i.e. like a light barrier by measuring the transit time. Measuring of that component that extends in the direction of the optical axis, i.e., transversely to the straight line passing through the focussing spots and in the longitudinal direction of the two beams, is made according to the Doppler principle, wherein use is made of the circumstance that a particle moving in the direction of the optical axis of a beam does not emit light with the radiation frequency of scattered light but with a frequency different therefrom, the frequency deviation being proportional to the velocity component in beam direction. In any case, in the method and with the device according to the invention, those photoelectric converters which are also used for the start-stop measurement are partly co-used for the Doppler measurement of the velocity vector extending in the direction of the optical axis. The measuring path formed between the focussing spots of the laser beams is rotated in the course of the measurement so as to detect the vector angle in the focal plane extending vertically to the beam direction. By using the same beams, the velocity component vertical thereto is detected according to the Doppler principle and allocated, particle by particle, to the other velocity component, i.e., the one in the focal plane.

The device according to the invention offers the advantage of a simple construction. It can be used in narrow sites and such sites difficult to access, e.g. in a flow channel for measuring the flow conditions at turbine blades, the beams being sent through a window of the flow channel and generating the measuring volume in the interior of the flow channel. Only a relatively small aperture angle is required for the optical access to the flow channel. The measurement of the velocity component in the direction of the optical axis is independent of the measurement of the two other velocity components (amount and direction within the focal plane). Detecting the flow component at right angles to the focal plane does not require any additional measuring time.

BRIEF DESCRIPTION OF THE DRAWINGS

Hereinafter, embodiments of the invention are explained in more detail with reference to the drawings, in which:

FIG. 8 is a schematic representation of a further embodiment of the measuring device.

DESCRIPTION OF THE PREFERRED EMBODIMENTS

Figure 1:
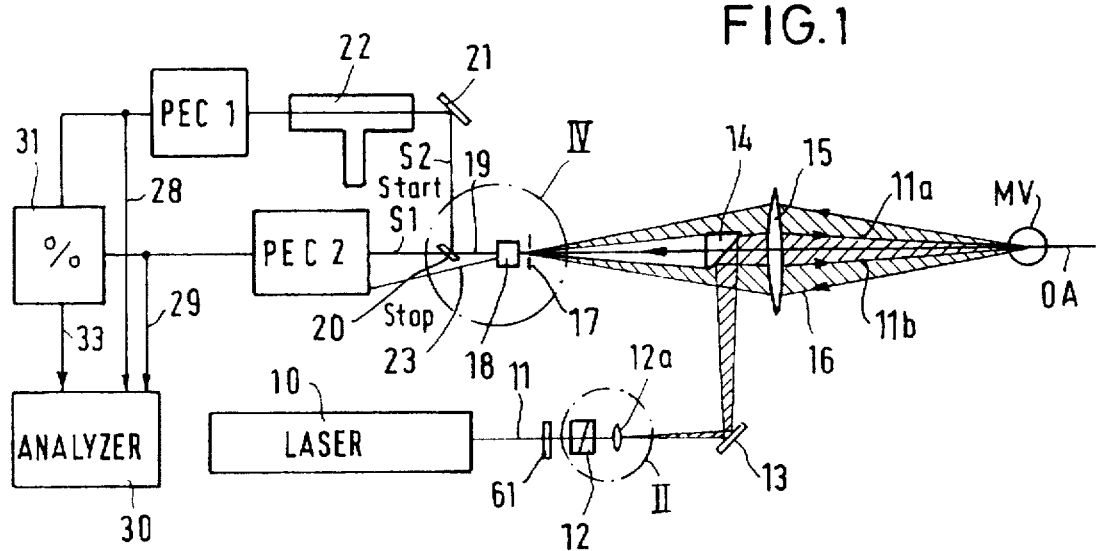
FIG. 1 shows a block diagram of a first embodiment of the invention in a simplified form.

FIG. 1 shows the basic construction of a first embodiment of the measuring device.

Figure 2:
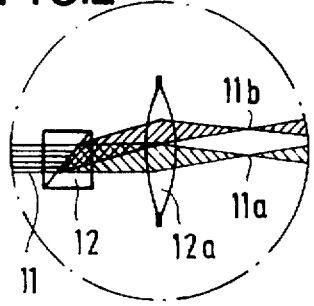
FIG. 2 shows an enlarged representation of the detail II of FIG. 1.

A laser 10 produces a laser beam 11. The laser is, e.g., an Ar$^+$laser having a wavelength of 514 nm, or a frequency-doubled YAG laser having a wavelength of 532 nm. The laser beam 11 is divided into two diverging component beams 11a, 11b by means of a $\lambda/4$ plate 61 and a beam splitter 12, e.g., a Rochon prism (FIG. 2). Both component beams are substantially aligned in parallel by an optic 12a and deflected at right angles onto a prism 14 by a mirror 13. The prism 14 deflects the component beams again at right angles. Behind the prism 14, there is a focussing optic 15 focussing each of the component beams 11a, 11b in the measuring volume MV, a focussing spot of its own being formed for each beam. The focussing spot of the beam 11a is located in the measuring volume MV accurately on the optical axis OA of the focussing optic 15, while the focussing spot of the beam 11b is laterally offset from the optical axis OA.

The focussing spots included in the measuring volume MV are imaged in an imaging plane 17 by the focussing optic 15. Behind the imaging plane 17, there is a microscope 17 imaging the imaging plane 17 onto the receiving surfaces of two photoelectric converters PEC1 and PEC2. The beam 19 of the one focussing spot F1 is guided to a beam splitter 20 transmitting the one component beam S1 to the converter PEC2 and sending the other component beam S2, via a mirror 21, through a frequency/amplitude converter 22 to the other photoelectric converter PEC1.

The beam 23 issuing from the other focussing spot F2 is received only by the converter PEC2.

Figure 3:
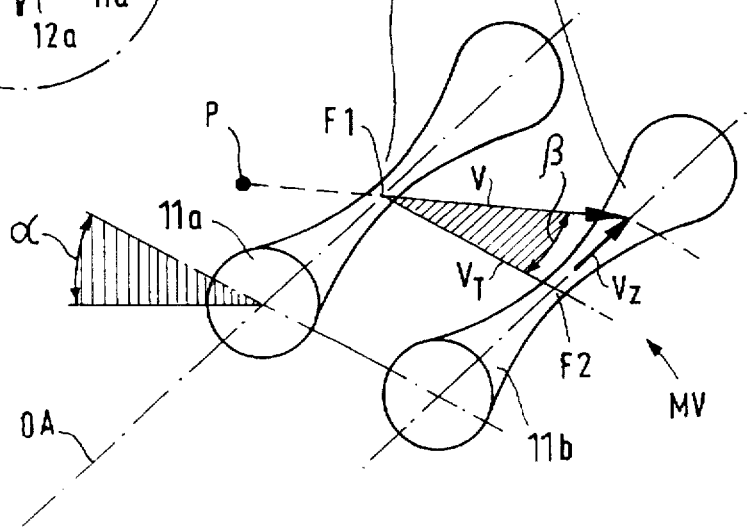
FIG. 3 is a perspective view of the measuring volume.
Figure 4:
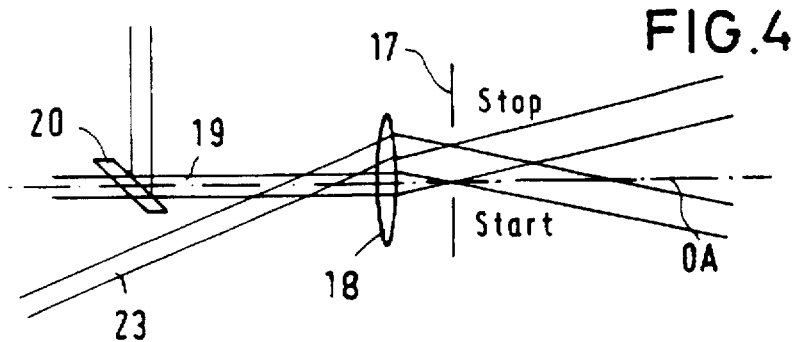
FIG. 4 shows an enlarged representation of the detail III of FIG. 1.

FIG. 3 shows the measuring volume MV. The focussing spot F1 of the component beam 11a lies on the optical axis OA of the focussing optic 15, and the focussing spot F2 of the other component beam 11b is spaced laterally therefrom and lies parallel thereto. As can be seen from FIG. 2, the focussing spots F1 and F2 are no fixedly defined points but elongated. When rotating the beam splitter 12, the one component beam 11a remains on the optical axis OA, whereas the other component beam 11b is pivoted about the optical axis OA. This pivot angle is designated by $\alpha$ in FIG. 2. The angle $\beta$ denotes the deviation of the velocity vector v from the normal plane to the optical axis OA.

A particle P passing the two focussing spots F1 and F2 is successively illuminated by both component beams 11a, 11b. Then, the particle emits scattered light received by the converters PEC1 and PEC2. The light pulses of the component beam 11a are supplied to the converter PEC1 and thereupon, this converter generates start pulses. The light pulses caused by the component beam 11b are supplied to the converter PEC2, and thereupon, this converter generates stop pulses. Besides, the converter PEC2 additionally generates a pulse whenever the converter PEC1 generates a pulse.

Figure 6:
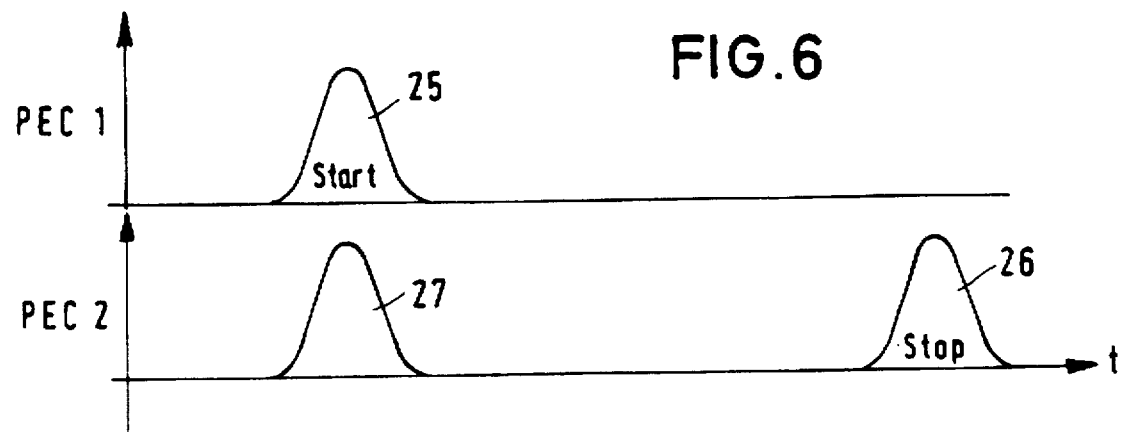
FIG. 6 shows a representation of the pulses generated at the photoelectric converters upon the passage of a particle through the measuring volume.

In FIG. 6, the start pulse generated by the converter PEC1 is designated by 25 and the stop pulse generated by the converter PEC2 by 26. The time t between the start pulse 25 and the stop pulse 26 is a measure for the velocity component $v_T$ of the particle P between the two component beams 11a, 11b. In order to determine the entire velocity vector v, it is important to know the velocity component $v_z$, (FIG. 3) in the direction of the optical axis OA. To determine the velocity component $v_z$, the frequency/amplitude converter 22 is used in combination with the two photoelectric converters PEC1 and PEC2.

The optical frequency/amplitude converter has the effect that it transmits incident light with a transmission factor dependent on the wavelength.

The light frequency of the beam 19 issuing from the focussing spot F1 depends on the frequency of the irradiation light and on the velocity component $v_z$ of the particle in beam direction. This velocity component generates a Doppler shift of the scattered light. The Doppler shift $\Delta \upsilon$ amounts to $$\Delta \upsilon = \upsilon_0 \frac{2v_z}{c} \quad (1)$$

wherein $\upsilon_0$ is the frequency of the laser light, $\Delta \upsilon$ is the Doppler shift of the scattered light in backscattering, and c is the light speed. As a consequence, the Doppler shift $\Delta \upsilon$ is a measure for the velocity component $v_z$ in beam direction.

Figure 5:
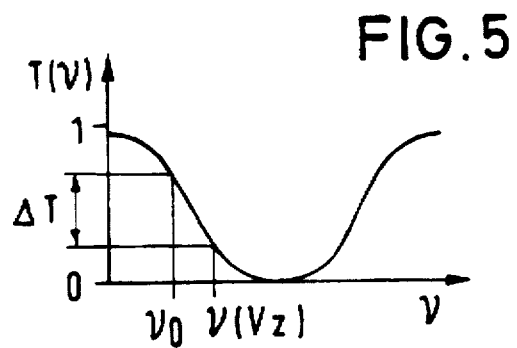
FIG. 5 shows the transmission characteristics of the optical frequency/amplitude converter.

As optical frequency/amplitude converter, a iodine cell having the transmission behavior shown in FIG. 5 and depending on the frequency $\upsilon$ is used. In FIG. 5, the transmission of the iodine cell T($\upsilon$) is illustrated in dependence on the frequency $\upsilon$. When the frequency $\upsilon_0$ changes due to a velocity component $v_z$, the laser light reflected by the particle has a frequency $\upsilon(v_z)$, whereby the transmission T of the converter 22 changes by the value $\Delta T$.

Hence, the converter 22 provides the photoelectric converter PEC1 with light of an intensity varying as a function of the velocity component $v_z$ in the direction of the optical axis. Thereupon, the photoelectric converter PEC1 generates an electric pulse whose amplitude depends on the intensity of the incident light, i.e. varies corresponding to the transmission of the converter 22.

The output signals of the converters PEC1 and PEC2 are supplied as start and stop pulses to a multichannel analyzer 30 via the lines 28 and 29. Further, the output pulses of the converters PEC1 and PEC2 are supplied to a divider 31. Meanwhile, the amplitude of the output signal of the converter PEC2 serves as reference value for the amplitude of the output signal of the converter PEC1.

As can be seen from FIG. 6, the start light pulses are not only supplied to the converter PEC1 via the converter 22, but also via the partially transmitting mirror 20 to the converter PEC2, which generates a reference pulse 27 simultaneously with the start pulse 25 (FIG. 6). Thus, the ratio between the pulses 25 and 27 is formed in the divider 31 and supplied to the multichannel analyzer 30 via a line 33.

From the Doppler shift, the velocity component $v_z$ is determined according to the above equation (1). Therefrom, the multichannel analyzer 30 calculates the angle $\beta$ for each particle passage in accordance with $$\beta = \tan \frac{v_z}{v_T} \quad (2)$$

The velocity component $v_z$ is determined based on the Doppler principle and the velocity component $v_T$ within the normal plane to the optical axis is determined by transit time measurement between the beams 11a and 11b.

Figure 7:
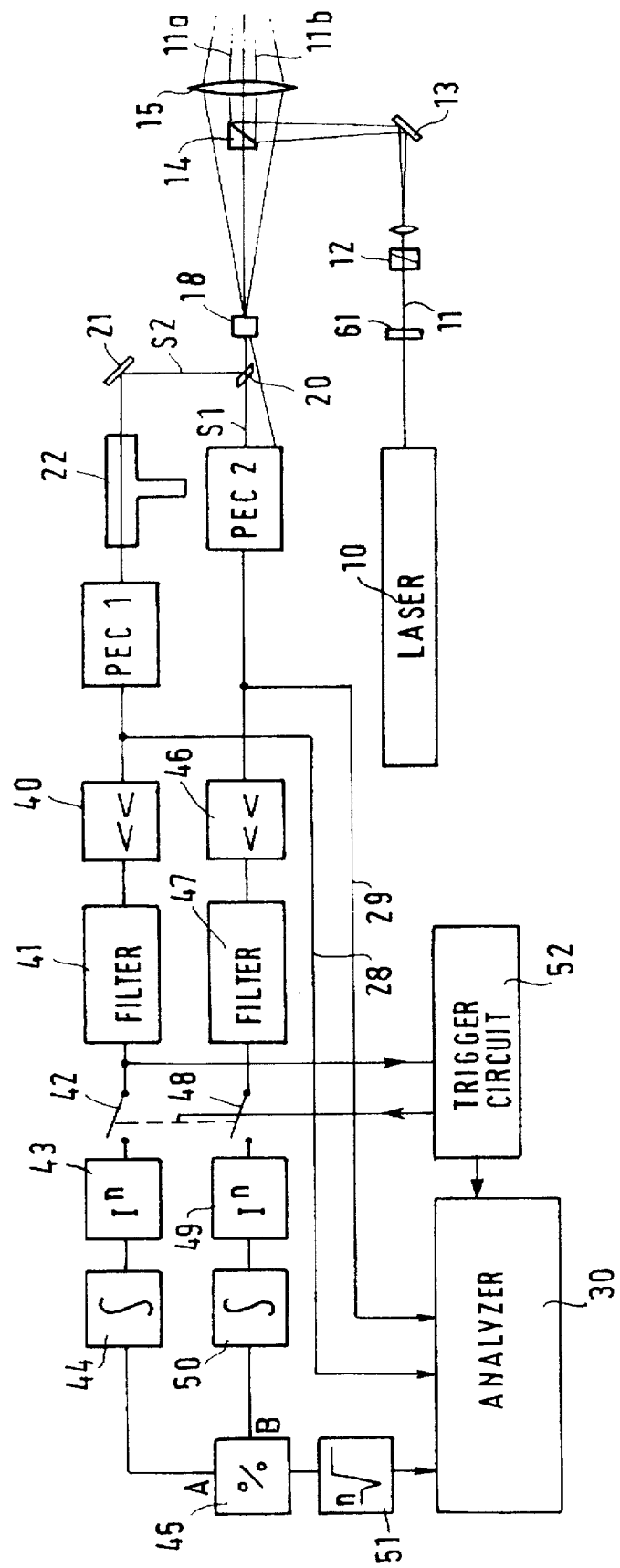
FIG. 7 shows another embodiment of a measuring device with an additional processing of the signals generated by the photoelectric converters for suppressing interferences.

FIG. 7 shows an embodiment wherein the measuring equipment is identical to that of FIG. 1 down to the photoelectric converters PEC1 and PEC2. The processing of the electrical signals of the photoelectric converters, however, is different, which is explained hereinafter.

The pulses generated by the photoelectric converters PEC1 and PEC2 are very noisy. The output signals of the photoelectric converter PEC1 are supplied to a frequency filter 41 via an amplifier 40 and transferred to an exponentiator 43. From the input signal I, the exponentiator 43 forms the output signal $I^n$ with the exponent n. The output signal of the exponentiator 43 is supplied to the one input of a dividing circuit 45 via an integrator 44.

The output signals of the photoelectric converter PEC2 are likewise amplified in an amplifier 46 and supplied, via a filter 47 and an electronic switch 48, to an exponentiator 49 which also forms the nth power of its input signal. The output of the exponentiator 49 is connected to the other input of the dividing circuit 45 via an integrator 50.

The dividing circuit 45 divides the dividend A by the divisor B, and the output signal A/B is supplied to a root calculator 51 extracting the nth root from this output signal (as radicand). The output signal of the root calculator 51 is supplied to an input of the multichannel analyzer 30.

The switches 42 and 48 are controlled by a trigger circuit 52 receiving the signal of the filter 41 as input signal and also controlling the multichannel analyzer 30. The integration intervals of the integrators 43 and 49 are determined through the trigger circuit.

By the described signal processing, the output signals of the photoelectric converters are exponentiated with an exponent n and integrated over a time interval $t_2-t_1$, before the division is effected. Thereafter, the integral values are divided and the nth root of the quotient is extracted. Thereby, it is achieved that the intensive central portion of a pulse, which has a good signal-to-noise ratio, is given more weight than the signal edges in which the signal-to-noise ratio is worse. Experimentally, n=2 has proven to be useful. The integration interval $t_2-t_1$ is arranged such that it begins before a start pulse and ends after the start pulse.

While the two photoelectric converters PEC1 and PEC2 supplying the start signals and the stop signals are also used for the Doppler principle in the previous embodiments as well, the embodiment of FIG. 8 provides for an additional photoelectric converter PEC3 to which the start light pulses are supplied via a partially transmitting mirror 16 arranged between the two mirrors 60 and 21. The photoelectric converter PEC2 generates the reference pulses for the pulses generated by the photoelectric converter PEC1, whose amplitudes are influenced by the transmission of the frequency/amplitude converter 22. The signals of the converters PEC1 and PEC2 are supplied to the dividing circuit 45, which supplies the quotient to the multichannel analyzer 30 thereupon. The signals of the converter PEC3, which are more intensive than those of the converter PEC1, are used as start signals for the transit time measurement. The signals of the converter PEC2 are used as stop signals.

It is claimed:

1. A method for measuring a flow vector in a gas flow by detecting two components and an angle of a velocity vector of an optically detectable particle contained in the flow, the method comprising:

providing a first beam and a second beam, the first beam and the second beam being substantially parallel and defining a beam direction, focusing the first beam at a first spot and focusing the second beam at a second spot, the first spot and the second spot being substantially adjacent, supplying light scattered by a particle passing through the first spot to a first photoelectric converter and generating a start pulse in response thereto, supplying light scattered by a particle passing through the second spot to a second photoelectric converter and generating a stop pulse in response thereto, dividing light scattered by a particle passing through one of the spots into a first component beam and a second component beam, supplying the first component beam directly to the photoelectric converter assigned to the one of the spots, supplying the second component beam to the photoelectric converter assigned to the other spot via an optical frequency/amplitude converter, and obtaining a measuring value from output signals of the photoelectric converters caused by the first and second component beam corresponding to the velocity component of the particle in the beam direction.

2. The method of claim 1, comprising:

providing the first photoelectric converter with light scattered by a particle passing thorough the first spot and the second spot, and using the first photoelectric converter to generate a reference signal for estimating the amplitude of an output signal of the second photoelectric converter as well as at least one of the start pulse and the stop pulse.

3. The method of claim 1, comprising:

integrating signals output by the photoelectric converters over time to thereby generate a plurality of integration values, and obtaining a quotient of the integration values.

4. The method of claim 3, comprising:

exponentiating the signals output by the photoelectric converters with an exponent n prior to integrating the signals output by the photoelectric converters, calculating a division result, and extracting an nth root from the division result.

5. A device for measuring a flow vector in a gas flow by detecting two components and an angle of a velocity vector of an optically detectable particle contained in the flow, the device comprising:

an optic for providing a first focused beam at a first spot and a second focused beam at a second spot, the first spot and the second spot being substantially adjacent and defining a beam direction, at least one first photoelectric converter for receiving light scattered by a particle passing through the first spot and for generating a start pulse in response thereto, at least one second photoelectric converter for receiving light scattered by a particle passing through the second spot and for generating a stop pulse in response thereto, a beam splitter for dividing light scattered by a particle passing through one of the first spot and the second spot into a first component beam and a second component beam, an optical frequency/amplitude converter via which the second component beam is supplied to the photoelectric converter associated with the other spot, and means for obtaining a measuring value from output signals of the photoelectric converters caused by the first and second component beams corresponding to the velocity component of the particle in the beam direction.

6. The device of claim 5, wherein the at least one second converter generates at least one of the start pulse and the stop pulse.

7. The device of claim 6, wherein the beam splitter supplies light scattered by a particle passing through the second spot to the at least one second converter for generating a stop pulse, and wherein the beam splitter supplies, via the frequency/amplitude converter, light scattered by a particle passing through the second spot to the first photoelectric converter for generating a start pulse.

8. The device of claim 5, comprising:

an integrator connected downstream of each of the photoelectric converters.

9. The device of claim 8, comprising:

an exponentiator connected between the converter and the integrator, a divider, and a root calculator connected downstream of the divider.

* * * * *